Patented Dec. 6, 1938

2,138,934

UNITED STATES PATENT OFFICE 2,138,934

SULPHONAMIDE COMPOUNDS

William Henry Moss, London, England, assignor to Celanese Corporation of America, a corporation of Delaware No Drawing. Application April 18, 1936, Serial No. 75,221. In Great Britain April 27, 1935

7 Claims. (Cl. 106—40)

This invention relates to new compounds and more particularly to new modifiers for incorporation in compositions of matter containing a cellulose ester or ether.

In the production of coating compositions, moulding powders, plastics and the like from cellulose esters and ethers, it is frequently necessary to incorporate in the composition a plasticizer and/or a resin in order to modify the properties of the product. Thus for example a plasticizer may be incorporated in a film to impart flexibility thereto, or a resin incorporated in a varnish to impart hardness to the varnish film. It will readily be appreciated that it is highly desirable that such modifiers should be of good compatibility with the cellulose ester or ether of the composition and should be fast to light.

It has now been found that the aromatic sulphonamides containing an esterified N.hydroxyalkyl group combine high compatibility with cellulose esters and ethers, with excellent fastness to light. Aromatic sulphonamides containing an esterified N.hydroxyalkyl group are novel compounds and the invention includes the compounds, their production, and their application in the plastics art. The invention particularly contemplates compounds in which the esterifying radical is a carboxylic acid radical though it includes compounds in which the esterifying radical is that of another type, e. g., the radical of benzene sulphonic acid, toluene sulphonic acid, or other sulphonic acid.

The aryl nucleus of the sulphonamide may contain a single ring as in the esterified N.hydroxyalkyl-benzene-sulphonamides or more than one ring, as for example in the esterified N.hydroxyalkyl-naphthalene-sulphonamides. It may also be substituted for example by alkyl groups, e. g. methyl or ethyl groups, acidylamino groups, hydroxy groups or halogen atoms or other atoms or groups, or it may be unsubstituted. Of special importance are the esters of N.hydroxyalkyl-benzene-, toluene- and xylene-sulphonamides.

The nitrogen atom of the sulphonamide may be attached to a single esterified hydroxyalkyl group, as for example in the acetic esters of the benzene-, toluene-, and xylene- N-mono-hydroxyethyl-sulphonamides or more than one esterified hydroxyalkyl group as for example in the di-acetic esters of the benzene-, toluene-, and xylene-N-di(hydroxyethyl)-sulphonamides. Where the sulphonamide contains more than one sulphonamide group, it is not necessary that each sulphonamide group should contain an esterified hydroxyalkyl group. If desired the nitrogen atom of a sulphonamide group may carry both an acidyloxy-alkyl group and another group, for example an unsubstituted alkyl group, e. g. methyl or ethyl, or a substituted alkyl group, e. g., hydroxyethyl or other hydroxyalkyl group. In addition to the acidyloxy grouping the alkyl group of an N-acidyloxy-alkyl residue may contain in addition to the acidyloxy substituent, other substituents such for example as halogen atoms or unesterified hydroxy groups.

The sulphonamides of the present invention may be prepared, for example, by the direct esterification of a hydroxy group or hydroxy groups in an N.hydroxyalkyl-sulphonamide. Thus, for example, the mono- and di-acetyl derivatives of para-toluene-N-di-(hydroxyethyl)-sulphonamides may be prepared by the mono- or di-acetylation respectively of para-toluene-N-di-(hydroxyethyl)-sulphonamide. Again, the acetyl derivative of benzene N.chlorhydroxypropyl sulphonamide may be prepared by the acetylation of benzene N-(chlorhydroxypropyl)-sulphonamide, and the acetyl derivative of p-toluene-N-hydroxyethyl-sulphonamide by acetylation of the parent hydroxyethyl compound.

The N-hydroxyalkyl-sulphonamides may be obtained by the action of hydroxyalkylating agents on aromatic sulphonamides. For example mono-hydroxyethyl-p-toluene sulphonamide and di-(hydroxyethyl)-p-toluene-sulphonamide may be obtained by the interaction of p-toluenesulphonamide and ethylenechlorhydrin in the presence of aqueous caustic soda. The corresponding benzene-sulphonamide compounds may be obtained similarly from benzene-sulphonamide. Benzene - N -(chlorhydroxypropyl) - sulphonamide may be obtained from epichlorhydrin and benzene-sulphonamide.

Esterification may be brought about, for example, by reaction of the hydroxy compound with the acid, acid anhydride or acid chloride, for example acetic acid, acetic anhydride or toluenesulphochloride. In general the products obtained by esterification of a single hydroxy group in an N.hydroxyalkyl aromatic sulphonamide with a mono- or poly-carboxylic acid (including a dicarboxylic acid) and by the esterification of more than one hydroxy group in an N.di(hydroxyalkyl) aromatic sulphonamide with a mono-carboxylic acid, are plasticizers. Thus, for example, plasticizers of excellent compatibility with cellulose acetate may be obtained by esterifying hydroxy groups in N.hydroxyalkyl sulphonamides with a mono-carboxylic aliphatic acid such for example as acetic acid or lactic acid. Products obtained by esterification with mono-carboxylic aromatic acids, such for example as benzoic acid, are in general plasticizers of lower compatibility with cellulose acetate than are the plasticizers obtained by esterification with mono-carboxylic aliphatic acids. These aromatic esters are, however, generally of good compatibility with nitrocellulose.

The introduction of a phosphate grouping into the compounds imparts thereto a fire-retardant action. In general, however, compounds containing inorganic ester groups are of lower compatibility with cellulose acetate than are the corresponding compounds containing aliphatic ester groups.

Esterification of an N.hydroxyalkyl aromatic sulphonamide containing two or more hydroxy groups with a polycarboxylic acid yields products which are usually resinous in character. These resinous compounds, and especially N.di(hydroxyalkyl)-sulphonamides, such for example as p-toluene N.diethanol sulphonamide, esterified with phthalic acid, (e. g. in the form of phthalic anhydride), are of excellent fastness to light and of good compatibility with cellulose acetate and other cellulose esters and ethers. Particularly useful are resinous products obtainable by esterifying with a proportion of polycarboxylic acid rather less than that which is equivalent to the hydroxyl groups present in the sulphonamide.

Instead of preparing the esterified N.hydroxyalkyl sulphonamides of the present invention by the direct esterification of a hydroxy group or groups in N.substituents, they may be prepared by other methods. Thus they may be prepared by the reaction between a sulphonamide and an alkylating agent capable of alkylating an amino group with an alkyl group containing an acidyloxy group. Examples of such agents are the carboxylic esters of halogen alcohols, e. g., chlorethyl-acetate, and esters of alcohols containing an ethylene oxide group, e. g., glycid acetate.

The esterified hydroxyalkyl sulphonamides of the present invention are, as has been indicated, in general of excellent compatibility with cellulose acetate. They may, however, be employed in conjunction with other derivatives of cellulose, e. g. cellulose nitrate, cellulose formate, cellulose propionate, or cellulose butyrate or other cellulose ester, or methyl cellulose, ethyl cellulose, benzyl cellulose or other cellulose ethers.

The sulphonamides may be incorporated with cellulose esters or ethers in any convenient manner. Thus for example they may be incorporated in a solution of a cellulose derivative in a volatile solvent and the solvent evaporated, if a solid product is required. Where they are plasticizers they may be worked up mechanically with the cellulose derivative in conjunction with small quantities of volatile solvents for the plasticizer and for the cellulose derivative. Again, for the purpose of producing moulding powders, a plasticizer may be absorbed by a finely divided cellulose derivative directly from solutions or dispersions of the plasticizer or a plasticizer may be precipitated onto the finely divided cellulose derivative from solutions of the plasticizer.

The compositions of matter of the present invention which may be in solution or solid form may be utilized for a large number of purposes. Solutions of cellulose esters or ethers containing the esterified N.hydroxyalkyl sulphonamides in volatile solvents, such for example as acetone, with or without other substances, such for example as other plasticizers, medium or high boiling solvents, resins whether natural or synthetic, fire-retardants, effect materials and the like, may be employed as lacquers, varnishes, adhesives or other coating or impregnating compositions, e. g., for the protection of rubber and other insulation and for insulating purposes generally. Solutions containing cellulose esters or ethers and the sulphonamides in volatile solvents may also be deposited on a smooth surface, such for example as the surface of a travelling band or the like and the volatile solvent evaporated or otherwise removed so as to form foils or films. Again, the solutions may be extruded into an evaporative atmosphere or into a precipitating bath and artificial filaments formed.

The compositions, for example in the form of moulding powders, may be moulded for example by pressure moulding processes or by injection moulding to form articles, or the compositions may be worked up into sheets suitable, for example, for use as the reinforcing material in splinterless glass, or into rods, tubes or blocks.

The proportion of the sulphonamide ester plasticizers employed may be varied in accordance with the particular requirements of the composition. In general, it has been found that for the production of cellulose acetate plastics a sulphonamide ester plasticizer may be present in amounts of between 25 and 50% of the weight of the cellulose derivative. For more flexible products more than 50% of plasticizer based on the weight of the cellulose derivative may be employed, whilst for very hard products less than 25%, e. g., 10%, of the sulphonamide may be employed. For plasticizing benzyl cellulose rather less plasticizer is necessary than for plasticizing cellulose acetate for the same degree of flexibility to be obtained.

The sulphonamide ester resins, for example the oxyalkyl sulphonamide phthalates, are, as has been indicated, also of high compatibility with cellulose acetate and may be used in conjunction therewith in a wide range of proportions. For most purposes, however, it is not found necessary to employ more than about 25% of the resin on the weight of the cellulose acetate.

While the invention has been described more particularly in connection with cellulose ester or ether compositions, the plasticizers and resins hereinbefore described may be employed in other types of plastic compositions comprising a base material and a plasticizer, e. g., polyvinyl acetate or other polyvinyl or synthetic resin compositions, which may or may not contain a cellulose ester or ether.

The following examples illustrate the invention but are not to be regarded as limiting it in any way.

*Example 1*

1 part of N-mono-hydroxyethyl-p-toluene-sulphonamide or N-di-(hydroxyethyl)-p-toluene-sulphonamide is boiled with 2 parts of a mixture of equal parts of acetic acid and acetic anhydride for one hour under a reflux condenser. The reaction product is poured into about three times its volume of hot water and the mixture boiled for a few minutes. The product which separates is then washed twice with two or three times its volume of hot water and then dissolved in ether, again washed with water and the ether evaporated from the solution.

*Example 2*

25 parts of N-di-(hydroxyethyl)-p-toluene-sulphonamide is heated with 10 parts of phthalic anhydride for one hour at 200° C. A brown resin is thus obtained.

*Example 3*

43 parts of N-mono-hydroxyethyl-p-toluene sulphonamide are heated with 15 parts of phthalic anhydride for one hour at 200° C. The product is a soft resinous mass soluble in acetone or hot alcohol.

*Example 4*

A moulding powder is prepared as follows:—
100 parts of powdered cellulose acetate are stirred for several hours with 1500 parts of water and 45 parts of one of the acetylated products obtained according to Example 1. The cellulose acetate and plasticizer is then filtered off from the water and dried.

A moulding powder may similarly be prepared from the following:

| | Parts |
|---|---|
| Cellulose acetate | 100 |
| Resin obtained as described in Example 2 | 25 |
| Acetyl compound of N-mono-hydroxyethyl-p-toluene-sulphonamide or N-di-(hydroxyethyl)-p-toluene-sulphonamide | 25 |

*Example 5*

The following are examples of solutions suitable for film-forming purposes:

| | Parts |
|---|---|
| (a) Cellulose acetate | 100 |
| Acetylated mono- or di-hydroxyethyl compound prepared according to Example 1 | 25 |
| Acetone | 300 |
| (b) Cellulose acetate | 100 |
| Compound obtained according to Example 3 | 50 |
| Acetylated N-di-(hydroxyethyl)-toluene-sulphonamide | 50 |

*Example 6*

The following are examples of lacquers containing the sulphonamide compounds of the present invention.

(a) Lacquer suitable for the coating of electric cables:

| | Parts |
|---|---|
| Cellulose acetate | 100 |
| Acetyl compound of mono- or di-(hydroxyethyl)-p-toluene-sulphonamide | 150 |
| Acetone | 300 |
| Alcohol | 150 |
| Benzene | 150 |

(b) Lacquer suitable for the coating of metal surfaces:

| | Parts |
|---|---|
| Cellulose acetate | 100 |
| Diphenylol-propane-formaldehyde resin | 100 |
| Acetyl compound of mono- or di-(hydroxyethyl)-p-toluene-sulphonamide | 25 |
| Acetone | 400 |
| Methyl-ethyl-ketone | 100 |
| Methyl cellosolve | 50 |
| Alcohol | 200 |
| Benzene | 200 |
| Toluene | 50 |
| Ethyl lactate | 200 |

Having described my invention what I desire to secure by Letters Patent is:

1. A composition of matter comprising a substance selected from the group consisting of cellulose esters, cellulose ethers and resinous vinyl compounds and as a modifier therefor an aromatic sulphonamide having attached to a nitrogen atom of a sulphonamide group at least one lower alkyl group having an acidylated hydroxy group as a substituent.

2. A composition of matter comprising a cellulose derivative and, as a modifier therefor, an aromatic sulphonamide having attached to a nitrogen atom of a sulphonamide group at least one lower alkyl group having an acidylated hydroxy group as a substituent.

3. A composition of matter comprising cellulose acetate and as a modifier therefor an aromatic sulphonamide having attached to a nitrogen atom of a sulphonamide group at least one lower alkyl group having an acidylated hydroxy group as a substituent.

4. A composition of matter comprising cellulose acetate and, as a modifier therefor, an aromatic sulphonamide of the benzene series having attached to a nitrogen atom of a sulphonamide group at least one lower alkyl group having as a substituent a hydroxy group acidylated with a carboxylic acid residue.

5. A composition of matter comprising cellulose acetate and as a modifier therefor N-mono-(acetoxy-ethyl)-p-toluene-sulphonamide.

6. A composition of matter comprising cellulose acetate and as a modifier therefor N-di-(acetoxy-ethyl)-p-toluene-sulphonamide.

7. A composition of matter comprising cellulose acetate and, as a modifier therefor, a resinous condensation product of a dicarboxylic acid anhydride with a sulphonamide of the benzene series containing at least two lower hydroxyalkyl groups attached to nitrogen atoms of sulphonamide groups.

WILLIAM HENRY MOSS.